Figure 1:
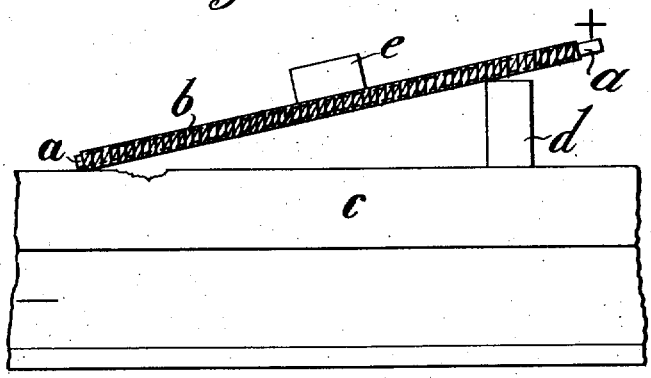

A. P. STROHMENGER.

ELECTRIC DEPOSITION OF METALS BY FUSION.

APPLICATION FILED MAR. 23, 1915.

Reissued Aug. 24, 1915. 13,970.

Inventor:—
Arthur Percy Strohmenger
by
Brindle, Wright & Small
Attorneys

UNITED STATES PATENT OFFICE.

ARTHUR PERCY STROHMENGER, OF WESTMINSTER, LONDON, ENGLAND, ASSIGNOR TO SLAUGHTER AND COMPANY, LIMITED, OF LONDON, ENGLAND.

ELECTRIC DEPOSITION OF METALS BY FUSION.

13,970. Specification of Reissued Letters Patent. Reissued Aug. 24, 1915.

Original No. 1,073,543, dated September 16, 1913, Serial No. 741,942. Application for reissue filed March 23, 1915. Serial No. 16,479.

*To all whom it may concern:*

Be it known that I, ARTHUR PERCY STROHMENGER, a subject of the King of Great Britain, residing at Caxton House, Westminster, London, England, have invented new and useful Improvements in the Electric Deposition of Metals by Fusion, of which the following is a specification.

This invention relates to processes in which an electric current is employed to fuse a metal electrode so that the fused metal is deposited upon a metal surface or surfaces which are thereby welded or patched.

According to the method of practising this invention shown in the drawings, the electrode, which has a coating of insulating material, is pressed down upon the work by a weight or its equivalent, so that throughout the process the end of the electrode is in electrical contact with the work, as will be explained more fully hereinafter.

The electrode may be made in the shape of a bow or arch or may be straight, in which case one end will be separated from the work by a distance piece.

The insulating material which I prefer to use is asbestos spun into the form of yarn and smeared with a suitable composition such as sodium silicate, aluminum silicate and the like to vary the fusing temperature of the yarn.

The accompanying drawing shows diagrammatically two methods of patching the worn head of a tramway rail.

Figure 2:
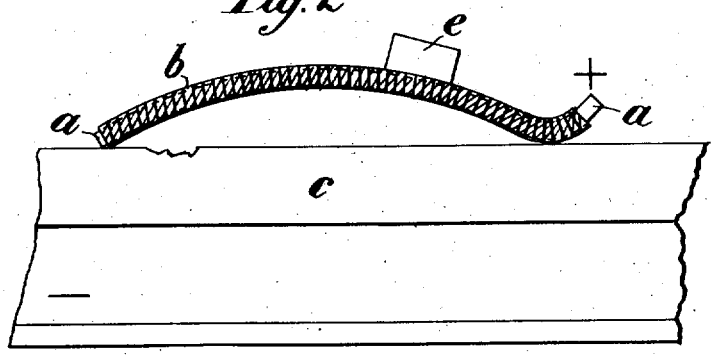

Figure 1 shows the use of a straight electrode and Fig. 2 shows the use of a curved electrode.

In Fig. 1 the electrode, formed of a strip of metal *a* coated with insulating material *b* is connected for instance, to the positive pole of a source of direct current and is placed on the rail *c* (which is connected to the negative pole), and after the arc has been started by touching the end of the strip of metal *a* to the rail, the electrode may be placed in an inclined position, one end being supported by a block *d*, and a weight *e* being placed upon the electrode. The arc having been started, the coating *b*, which protects the electrode and prevents the current jumping from the electrode to the work except at the end, is fused about the end of the electrode strip *a*, and the fused coating material acts as a slag while the metal of the strip is also fused at the end and deposited on the rail. The strip of metal *a* is kept in actual contact at its end with the molten metal and slag, but out of actual contact with the rail, as the point of fusion moves back along the strip, the metal of the strip being prevented from having actual contact with the rail either by causing the electrode to rest upon the insulating coating *b* or by holding it so that, while the end of the strip touches the molten metal and slag, it does not touch the rail. The insulating coating which is fused, floats as slag upon the molten metal so protecting the latter from oxidation, and helping to free both the molten metal and the surface of the rail from impurities.

In Fig. 2 instead of a straight strip supported on a block, a curved strip is shown.

By the expression "at an angle to the work" used in the claims, is meant not lying upon the work throughout its length, in which position it would be parallel to the work, but in any position where its non-fusing end is away from the work, such as at an acute, a right angle, or other angle to the work.

What I claim is—

1. The process of depositing metal by means of the electric current, which comprises connecting the work and a metal electrode with opposite poles of a source of electricity, said electrode being coated with insulating material that is adapted to act as a slag when fused placing the electrode at an angle to the work, striking an arc between the end of the electrode and the work and forming molten metal and slag, and maintaining the electrode at an angle to the work, and in actual contact with the molten metal and slag.

2. A process of depositing metal by means of the electric current, which comprises connecting the work to one pole of a source of electricity, placing upon the line along which metal is to be deposited and at an angle to the work a metal electrode coated with insulating material adapted to act as a slag when fused, connecting this electrode to the other pole of the source of current, striking an arc between the work and the end of the electrode, and pressing this end of the electrode down on to the work whereby the electrode is maintained in contact with the molten metal and slag during the continuance of the process.

ARTHUR PERCY STROHMENGER.

Witnesses:

HUBERT A. GILL,

H. W. BLAKE.